United States Patent
Wu et al.

(10) Patent No.: US 11,159,571 B2
(45) Date of Patent: Oct. 26, 2021

(54) APPARATUS, METHOD AND DEVICE FOR ENCAPSULATING HETEROGENEOUS FUNCTIONAL EQUIVALENTS

(71) Applicants: Shanghai Hongzhen Information Science & Technology Co. Ltd., Shanghai (CN); China National Digital Switching System Engineering & Technological R&D Center, Henan (CN)

(72) Inventors: Jiangxing Wu, Henan (CN); Xinsheng Ji, Henan (CN); Lei He, Henan (CN); Peng Yi, Henan (CN); Hailong Ma, Henan (CN); Zheng Zhang, Henan (CN); Xueming Si, Henan (CN)

(73) Assignees: Shanghai Hongzhen Information Science & Technology Co. Ltd., Shanghai (CN); China National Digital Switching System Engineering & Technological R&D Center, Henan (CN)

( * ) Notice: Subject to any disclaimer, the term of this patent is extended or adjusted under 35 U.S.C. 154(b) by 335 days.

(21) Appl. No.: 16/336,697

(22) PCT Filed: Sep. 1, 2017

(86) PCT No.: PCT/CN2017/100196
§ 371 (c)(1),
(2) Date: Mar. 26, 2019

(87) PCT Pub. No.: WO2018/059186
PCT Pub. Date: Apr. 5, 2018

(65) Prior Publication Data
US 2020/0099722 A1    Mar. 26, 2020

(30) Foreign Application Priority Data
Sep. 27, 2016 (CN) .......................... 201610853938.7

(51) Int. Cl.
*H04L 29/06* (2006.01)

(52) U.S. Cl.
CPC .............. *H04L 63/20* (2013.01); *H04L 63/14* (2013.01)

(58) Field of Classification Search
CPC .................................. H04L 63/14; H04L 63/20
See application file for complete search history.

(56) References Cited

U.S. PATENT DOCUMENTS 9,954,885 B2 *   4/2018   Wu ..................... H04L 63/1433
2003/0191989 A1   10/2003   O'Sullivan
(Continued)

FOREIGN PATENT DOCUMENTS

| CN | 102549984 A | 7/2012 |
| CN | 103368858 A | 10/2013 |

(Continued)

OTHER PUBLICATIONS

First Office Action for Chinese Patent Application No. 201610853938.7, dated Apr. 1, 2019, and its English translation, 14 pages.

(Continued)

*Primary Examiner* — William J. Goodchild
*Assistant Examiner* — Rodman Alexander Mahmoudi
(74) *Attorney, Agent, or Firm* — Bret E. Field; Bozicevic, Field & Francis LLP

(57) ABSTRACT

An apparatus, method, and device for encapsulating heterogeneous functional equivalents are disclosed. The apparatus includes a redundancy controller, an input proxy, and an output proxy. In this application, a plurality of heterogeneous functional equivalents are encapsulated by an input proxy and an output proxy, so that the apparatus can support adaptation, normalization and dis-cooperation to cut a communication link employed by an attacker, such that it is difficult for the attacker to sniff and exploit unknown defects (Continued)

or backdoors, and a success rate of the attacker attacking an information system is reduced.

17 Claims, 5 Drawing Sheets

(56) References Cited

U.S. PATENT DOCUMENTS

2003/0195919 A1  10/2003  Watanuki et al.
2008/0209560 A1   4/2008  Dapp

FOREIGN PATENT DOCUMENTS

| CN | 105553975 A | 5/2016 |
| CN | 105611635 A | 5/2016 |
| CN | 106161417 A | 11/2016 |
| CN | 106161418 A | 11/2016 |
| CN | 106534063 A | 3/2017 |
| WO | WO0113228 A2 | 2/2001 |
| WO | WO2016133965 A1 | 8/2016 |

OTHER PUBLICATIONS

Extended European Search Report for European Patent Application No. 17854637.0, dated Jul. 1, 2020, 7 pages.

* cited by examiner

APPARATUS, METHOD AND DEVICE FOR ENCAPSULATING HETEROGENEOUS FUNCTIONAL EQUIVALENTS

The present application claims priority to Chinese Patent Application No. 201610853938.7, filed with the Chinese Patent Office on Sep. 27, 2016 and entitled "APPARATUS, METHOD AND DEVICE FOR ENCAPSULATING HETEROGENEOUS FUNCTIONAL EQUIVALENTS", which is incorporated herein by reference in its entirety.

TECHNICAL FIELD

The present invention relates to the field of cyberspace security defense technologies, and in particular, to an apparatus, method and device for encapsulating heterogeneous functional equivalents.

BACKGROUND OF THE INVENTION

Software and hardware apparatuses in the cyberspace field may be a system, a subsystem, a unit, a module, a component, and even a device. A structural state presented outwardly by these software and hardware apparatuses is referred to as structure characterization.

For software and hardware apparatuses with given service functions in the existing cyberspace field, there is a certain mapping relationship between their exterior structure form and interior structure form, and this mapping relationship is usually static and determinate as for a technical architecture in the cyberspace field. Particularly, most redundant systems in the prior art are homogeneous redundant systems, the interior structures and design logics of which are the same. Therefore, during homogeneous redundant scheduling, structure characterizations are the same, and are similar to a structure of a homogeneous functional equivalent and static.

In addition, their interior structures are similar to exterior structures to some extent. By analyzing such relationships, information on interior software and hardware structures of an apparatus can be obtained indirectly, and it is possible to further attack or intrude into the apparatus by sniffing or scanning an utilizable unknown defect or finding a contact channel to activate a trapdoor (backdoor), which poses threats to information security or network security of the apparatus.

SUMMARY OF THE INVENTION

This application provides an apparatus, method, and device for encapsulating heterogeneous functional equivalents to enhance security of a network information system. In order to resolve the foregoing technical problem, embodiments of the present invention disclose the following technical solutions:

According to a first aspect, an apparatus for encapsulating heterogeneous functional equivalents is provided, including an input proxy, a redundancy controller, and at least two heterogeneous functional equivalents with a same function, where the input proxy is configured to trigger the redundancy controller after receiving an external service request;

the redundancy controller is configured to: after being triggered by the input proxy, generate a proxy policy based on a control parameter and send the proxy policy to the input proxy, where the proxy policy includes an adaptation policy and a first dis-cooperation policy;

the input proxy is further configured to receive the adaptation policy, establish communication connections to selected heterogeneous functional equivalents based on the adaptation policy, and respectively send the service request to these heterogeneous functional equivalents via the communication connections; and the heterogeneous functional equivalents are configured to operate and output service responses after receiving the service request sent by the input proxy.

Further, the input proxy is specifically configured to: select, based on content in the service request and the adaptation policy, heterogeneous functional equivalents matching the content as heterogeneous functional equivalents for providing a service, and establish communication connections to these matched heterogeneous functional equivalents, where the content includes one of a communication connection, message content, a data format, a message order, an initial time, a delay and a rate; and the adaptation policy includes one of a communication connection, message content, a data format, a message order, an initial time, a delay and a rate of each heterogeneous functional equivalent.

Further, the input proxy is further configured to filter out, based on the first dis-cooperation policy and a minimization template in the adaptation policy, a communication connection, or a service request that does not match content of the minimization template, or a protocol field that does not match the external service request.

Further, the input proxy is further configured to modify content in the service request based on the first dis-cooperation policy, so that the content in the service request matches heterogeneous functional equivalents, where the content in the service request includes one of a communication connection, message content, a data format, a message order, an initial time, a delay and a rate.

Further, the input proxy is further configured to manage a cooperation relationship between each heterogeneous functional equivalent and outside of the apparatus based on the first dis-cooperation policy, isolate information exchange between heterogeneous functional equivalents from each other, and shield signal transmission between each heterogeneous functional equivalent and outside of the apparatus, before establishing the communication connections.

Further, the input proxy is specifically further configured to obtain structure change modes of the heterogeneous functional equivalents;

determine, based on the first dis-cooperation policy, whether a structure change mode of each heterogeneous functional equivalent belongs to one of preset modes, where the preset modes include a decision mode, a monitoring mode, and a random scheduling mode; and if the structure change mode belongs to one of the preset modes, shield a service request, which can leak the currently used preset mode, between each heterogeneous functional equivalent and outside of the apparatus according to a rule corresponding to the preset mode.

Further, the apparatus further includes an output proxy, and the proxy policy further includes a normalization policy, where the output proxy is configured to receive the service responses output by the heterogeneous functional equivalents;

the redundancy controller is further configured to send the normalization policy to the output proxy; and the output proxy is further configured to select one of the received service responses as a target service response based on the normalization policy, establish a communication connection between the target service response and outside of the apparatus, and output the target service response.

Further, the output proxy is specifically further configured to:

select a service request matching content of an external receive end of the apparatus from the received service responses based on the normalization policy, and use the service request as the target service request, where the content includes one of a communication connection, message content, a data format, a message order, an initial time, a delay and a rate.

Further, the proxy policy further includes a second dis-cooperation policy, the second dis-cooperation policy corresponding to the first dis-cooperation policy, and the output proxy is further configured to:

if the target service response is obtained based on the first dis-cooperation policy and filtering processing is performed on the service request, complement content of the target service response based on the second dis-cooperation policy before outputting the target service request, where the complemented content includes: a service response or a protocol field in a service response that does not match the first dis-cooperation policy and the content of the minimization template.

Further, the output proxy is further configured to: if the target service response is obtained based on the first dis-cooperation policy and the service request is modified, restore content of the target service response based on the second dis-cooperation policy, so that the content of the target service response is consistent with the service request before modification, where the restored content includes one of a communication connection, message content, a data format, a message order, an initial time, a delay and a rate.

Further, the output proxy is further configured to: manage a cooperation relationship between each heterogeneous functional equivalent and outside of the apparatus based on the second dis-cooperation policy, isolate information exchange between every two heterogeneous functional equivalents, and shield signal transmission between each heterogeneous functional equivalent and outside of the apparatus, after selecting the target service response.

Further, the output proxy is specifically further configured to:

obtain structure change modes of the heterogeneous functional equivalents;

determine, based on the second dis-cooperation policy, whether a structure change mode of each heterogeneous functional equivalent belongs to one of the preset modes, where the preset mode includes the decision mode, the monitoring mode, and the random scheduling mode; and if the structure change mode belongs to one of the preset modes, shield a service response, which can leak the currently used preset mode, between each heterogeneous functional equivalent and outside of the apparatus according to a rule corresponding to the preset mode.

According to a second aspect, a method for encapsulating heterogeneous functional equivalents is provided, used by an input proxy and including:

receiving an external service request, and sending the service request to a redundancy controller to trigger the redundancy controller;

receiving a proxy policy sent by the redundancy controller, where the proxy policy is generated based on a control parameter, and includes an adaptation policy and a first dis-cooperation policy;

receiving the adaptation policy, and establishing communication connections to selected heterogeneous functional equivalents based on the adaptation policy; and respectively sending the service request to these heterogeneous functional equivalents via the communication connections.

Further, establishing communication connections to selected heterogeneous functional equivalents based on the adaptation policy includes:

selecting, based on content in the service request and the adaptation policy, heterogeneous functional equivalents matching the content as heterogeneous functional equivalents for providing a service, where the content includes one of a communication connection, message content, a data format, a message order, an initial time, a delay and a rate; and establishing communication connections to these matched heterogeneous functional equivalents, where the adaptation policy includes one of a communication connection, message content, a data format, a message order, an initial time, a delay and a rate of each heterogeneous functional equivalent.

Further, after receiving the adaptation policy, the method further includes:

receiving the first dis-cooperation policy; and filtering out, based on the first dis-cooperation policy and a minimization template in the adaptation policy, a communication connection, or a service request that does not match content of the minimization template, or a protocol field in the external service request, where the unmatched service request includes a service request that has a different transmission protocol or was attacked.

Further, before establishing communication connections to selected heterogeneous functional equivalents, the method further includes:

managing a cooperation relationship between each heterogeneous functional equivalent and outside of the apparatus based on the first dis-cooperation policy;

isolating information exchange between every two heterogeneous functional equivalents; and shielding signal transmission between each heterogeneous functional equivalent and outside of the apparatus.

Further, shielding signal transmission between each heterogeneous functional equivalent and outside of the apparatus includes:

obtaining a structure change mode of a heterogeneous functional equivalent;

determining whether the structure change mode of the heterogeneous functional equivalent belong to one of preset modes, where the preset mode includes a decision mode, a monitoring mode, and a random scheduling mode; and if the structure change modes belong to one of the preset modes, shield a service request, which can leak the currently used preset mode, between each heterogeneous functional equivalent and outside of the apparatus according to a rule corresponding to the preset mode.

According to a third aspect, a method for encapsulating heterogeneous functional equivalents is provided, used by an output proxy and including:

receiving service responses output by the heterogeneous functional equivalents and a proxy policy sent by a redundancy controller, where the proxy policy includes a normalization policy;

selecting one of the received service responses as a target service response based on the normalization policy; and establishing a communication connection between the target service response and outside of an apparatus, and outputting the target service response, where the apparatus includes the redundancy controller, the output proxy, and at least two heterogeneous functional equivalents with a same function.

Further, selecting one of the received service responses as a target service response based on the normalization policy includes:

selecting a service request matching content of an external receive end of the apparatus from the received service responses based on the normalization policy, and using the service request as the target service request, where the content includes one of a communication connection, message content, a data format, a message order, an initial time, a delay and a rate.

Further, if the proxy policy further includes a second dis-cooperation policy and the second dis-cooperation policy corresponds to the first dis-cooperation policy, after receiving service responses output by the heterogeneous functional equivalents, the method further includes:

receiving the second dis-cooperation policy sent by the redundancy controller; and if the target service response is obtained based on the first dis-cooperation policy and filtering processing is performed on the service request, complementing content of the target service response based on the second dis-cooperation policy before outputting the target service request, where the complemented content includes: a service response or a protocol field in a service response that does not match the first dis-cooperation policy and content of a preset minimization template.

Further, after outputting the target service response, the method further includes:

if the target service response is obtained based on the first dis-cooperation policy and modification processing is performed on the service request, restoring content of the target service response based on the second dis-cooperation policy, so that the content of the target service response is consistent with the service request before modification, where the restored content includes one of communication connection, message content, a data format, a message order, an initial time, a delay and a rate.

Further, after receiving, by the output proxy, service responses output by the heterogeneous functional equivalents, the method further includes:

managing a cooperation relationship between each heterogeneous functional equivalent and outside of the apparatus based on the second dis-cooperation policy;

isolating information exchange between the heterogeneous functional equivalents; and shielding signal transmission between each heterogeneous functional equivalent and outside of the apparatus.

Further, shielding signal transmission between each heterogeneous functional equivalent and outside of the apparatus includes:

obtaining a structure change mode of the heterogeneous functional equivalent;

determining, based on the second dis-cooperation policy, whether the structure change mode of the heterogeneous functional equivalent belong to one of preset modes, where the preset mode includes a decision mode, a monitoring mode, and a random scheduling mode; and if the structure change mode belongs to one of the preset modes, shielding a service request, which can leak the currently used preset mode, between each heterogeneous functional equivalent and outside of the apparatus according to a rule corresponding to the preset mode.

According to a fourth aspect, a device for encapsulating heterogeneous functional equivalents is provided, including a transceiver, a processor and a memory, where the transceiver is configured to receive an external service request and a proxy policy, where the proxy policy includes an adaptation policy, a normalization policy, a first dis-cooperation policy and a second dis-cooperation policy, the first dis-cooperation policy corresponding to the second dis-cooperation policy;

the processor is configured to establish communication connections to selected heterogeneous functional equivalents based on the adaptation policy, and respectively send the service request to these heterogeneous functional equivalents via the communication connections; and the memory is configured to store the service request and the proxy policy.

25. The device according to claim 24, wherein the transceiver is further configured to receive output responses of the heterogeneous functional equivalents, where the selected heterogeneous functional equivalents output the output responses after operating based on the service request; and the processor is further configured to select one of the received service responses as a target service response based on the normalization policy, establish a communication connection between the target service response and outside of an apparatus, and output the target service response.

Further, the processor is further configured to filter out, based on the first dis-cooperation policy and a minimization template in the adaptation policy, a communication connection, or a service request that does not match content of the minimization template, or a protocol field that does not match the external service request;

the processor is further configured to modify content in the service request based on the first dis-cooperation policy, so that the content in the service request matches heterogeneous functional equivalents, where the content in the service request includes one of a communication connection, message content, a data format, a message order, an initial time, a delay and a rate; and the processor is further configured to manage a cooperation relationship between each heterogeneous functional equivalent and outside of the apparatus based on the first dis-cooperation policy, isolate information exchange between every two heterogeneous functional equivalents, and shield signal transmission between each heterogeneous functional equivalent and outside of the apparatus.

Further, the processor is further configured to: if the target service response is obtained based on the first dis-cooperation policy and filtering processing is performed on the service request, complement content of the target service response based on the second dis-cooperation policy before outputting the target service request, where the complemented content includes: a service response or a protocol field in a service response that does not match the first dis-cooperation policy and the content of the minimization template;

the processor is further configured to: if the target service response is obtained based on the first dis-cooperation policy and modification processing is performed on the service request, restore content of the target service response based on the second dis-cooperation policy, so that the content of the target service response is consistent with the service request before modification, where the restored content includes one of a communication connection, message content, a data format, a message order, an initial time, a delay and a rate; and the processor is further configured to: manage a cooperation relationship between each heterogeneous functional equivalent and outside of the apparatus based on the second dis-cooperation policy, isolate information exchange between every two heterogeneous functional equivalents, and shield signal transmission between each heterogeneous functional equivalent and outside of the apparatus, after selecting the target service response.

According to a fifth aspect, a computer storage medium is further provided, where the computer storage medium may store a program. When executed, the program comprises some or all steps in aspects of the apparatus, method, and device for encapsulating heterogeneous functional equivalents provided in the present invention.

The technical solutions provided in the embodiments of the present disclosure may produce the following beneficial effects:

In the apparatus, method, and device for encapsulating heterogeneous functional equivalents provided in the present invention, the input proxy/output proxy can maintain communication states between outside of the apparatus and heterogeneous functional equivalents based on the proxy policy and the external service request of the apparatus, normalize interaction interfaces between outside of an information system and the heterogeneous functional equivalents, manage dis-cooperation relationships between outside of the information system and the heterogeneous functional equivalents, allocate the external service request to these heterogeneous functional equivalents, and output a service response of a target heterogeneous functional equivalent. Therefore, with the adaptation policy, an internal structure of a plurality of heterogeneous functional equivalents can be hidden so that the entire apparatus is presented to outside in a normalized manner, and an abnormal running state of a heterogeneous functional equivalent can be hidden or concealed, which greatly decreases predictability of a defense behavior of the apparatus, and makes it difficult for an attacker to sniff and exploit trapdoors (backdoors) or vulnerabilities (defects) loaded in cyberspace due to loss of accessibility.

In addition, cooperation relationships between the heterogeneous functional equivalents and outside of the apparatus can be managed based on the dis-cooperation policies, so that information exchange between the heterogeneous functional equivalents can be isolated, signal transmission between each heterogeneous functional equivalent and outside of the apparatus may be blocked, and thereby prevents the attacker's cooperative attacks to trapdoors (backdoors) or vulnerabilities (defects) at a same location of a plurality of heterogeneous functional equivalents. Therefore, a success rate of the attacker attacking the information system can be decreased, and security of the apparatus can be improved.

BRIEF DESCRIPTION OF THE DRAWINGS

In order to describe the technical solutions in the embodiments of the present invention or in the prior art more clearly, the following briefly describes the accompanying drawings required for describing the embodiments or the prior art. Apparently, persons of ordinary skill in the art may still derive other drawings from these accompanying drawings without creative efforts.

DETAILED DESCRIPTION OF THE EMBODIMENTS

In order to make those skilled in the art understand the technical solutions in this application better, the technical solutions in the embodiments of this application are described below clearly and completely with reference to the accompanying drawings in the embodiments of this application. Apparently, the described embodiments are merely some rather than all of the embodiments of this application. The embodiments are merely examples of apparatuses and methods consistent with some aspects of this application as detailed in the claims.

The technical solutions provided in this application are used to enhance security of an information system in cyberspace. Two or more heterogeneous functional equivalents with a same function can be encapsulated, and with an adaptation policy received by an input proxy, a normalization policy received by an output proxy, and dis-cooperation policy for control, an abnormal running state of the encapsulated heterogeneous functional equivalents is hidden or concealed, which greatly decreases predictability of a defense behavior of an apparatus, and thereby makes it difficult for an attacker to sniff or exploit the trapdoors (backdoors) or vulnerabilities (defects) loaded in the cyberspace due to loss of accessibility.

The heterogeneous functional equivalents are configured to provide a service for an external service request, each of which has a same service function. A scale of each heterogeneous functional equivalent may be a system, a subsystem, a module, a function, middleware, a component, etc. The heterogeneous functional equivalent may be implemented by software, hardware, or software and hardware, the construction form of which may be rigid, or may be in a reconstructed, reassembled, or software-defined form.

Figure 1:
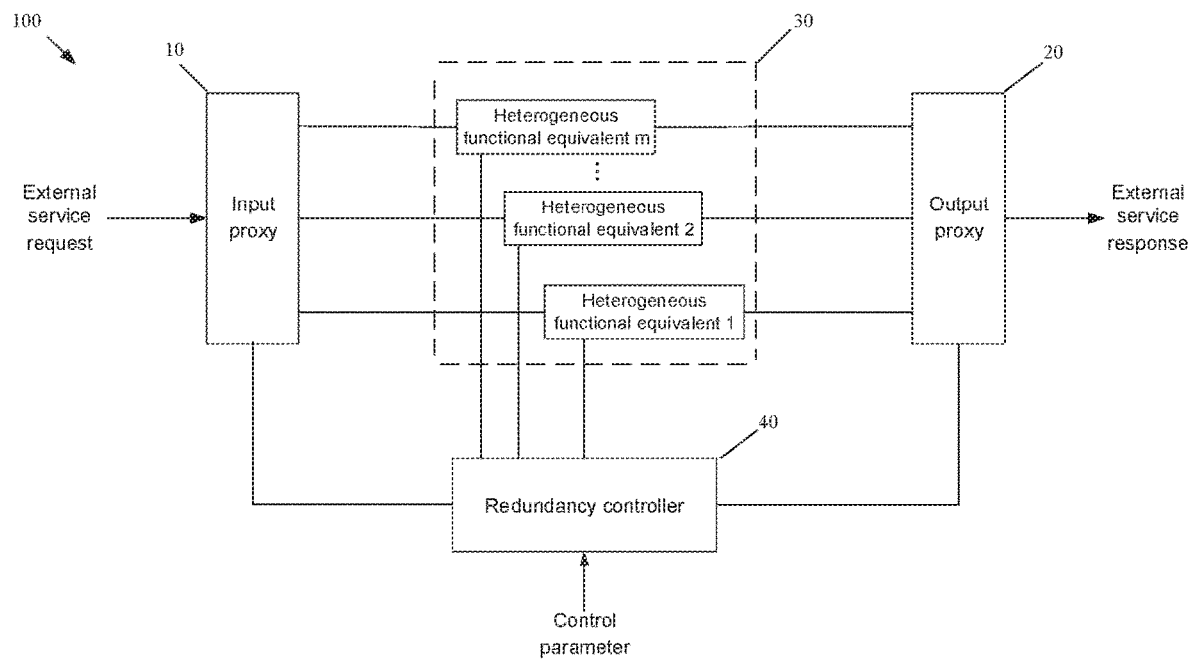
FIG. 1 is a schematic structural diagram of an apparatus for encapsulating heterogeneous functional equivalents according to an embodiment of this application.

An embodiment of this application provides an apparatus for encapsulating heterogeneous functional equivalents, which can improve security of a network device and reduce a possibility of heterogeneous functional equivalents being attacked. The apparatus provided in this embodiment encapsulates heterogeneous functional equivalents with a same function. Specifically, as shown in FIG. 1, the apparatus includes an input proxy 10, a redundancy controller 40, at least two heterogeneous functional equivalents with a same function, which are represented by 30, and an output proxy 20.

The input proxy 10 is configured to receive an external service request, and trigger the redundancy controller 40 after receiving the external service request. The service request (e.g., a memory access request, a route calculation request, or a web request) may be sent from an external device or manually set, and may be an instruction carrying a requested content. Each time the input proxy 10 receives a service request, it sends a trigger signal to the redundancy controller 40 to start the redundancy controller 40.

The redundancy controller 40 is connected to the input proxy 10, the output proxy 20, and the heterogeneous functional equivalents, respectively, and is configured to: generate a proxy policy based on a control parameter when triggered by the input proxy 10, and send the proxy policy to the input proxy 10, where the proxy policy includes an adaptation policy and a first dis-cooperation policy.

The adaptation policy includes content or an operation procedure, and is used to provide the input proxy 10 with any one of a name or number, a communication connection, message content, a data format, a message order, an initial time, a delay, and a rate of heterogeneous functional equivalents which are selected for providing service for the service request, and send information on the selected heterogeneous functional equivalents to the input proxy 10.

The control parameter is related to the service request, and may be from an exterior parameter generation apparatus, or may be generated by the redundancy controller 40.

The input proxy 10 is further configured to receive the adaptation policy, establish communication connections to the selected heterogeneous functional equivalents based on the adaptation policy, and respectively send the service request to these heterogeneous functional equivalents via the communication connections.

In a specific process of establishing communication connections, the input proxy 10 analyzes and extracts the content in the service request, selects, based on the content in the service request and the adaptation policy, heterogeneous functional equivalents matching the content as the heterogeneous functional equivalents for providing the service, and establishes communication connections to these heterogeneous functional equivalents matching the content. The content includes one of a communication connection, message content, a data format, a message order, an initial time, a delay and a rate. "Matching" means that one of a communication connection, message content, a data format, a message order, an initial time, a delay and a rate of each heterogeneous functional equivalent carried in the adaptation policy are compared with the content in the service request, respectively, and if a comparison result indicates that they are the same as the content, or the comparison result is within an allowed range, the heterogeneous functional equivalent is considered suitable for providing service for the service request. Otherwise, if they do not match the content, the unmatched heterogeneous functional equivalent cannot be used to provide service.

The selected heterogeneous functional equivalents are configured to operate and output service responses when receiving the service request sent from the input proxy 10.

In the apparatus provided in this embodiment, the input proxy selects suitable heterogeneous functional equivalents based on the adaptation policy, and establishes communication connections to these selected heterogeneous functional equivalents, so as to respectively send the service request to these selected heterogeneous functional equivalents, thereby establishing communication connections between one service request and a plurality of heterogeneous functional equivalents. Seen from the outside of the apparatus, the service request is connected to the input proxy, and the input proxy is connected to a heterogeneous functional equivalent group, so that it is unknown, at the outside of the apparatus, between which heterogeneous functional equivalent and the service request the communication connection is established, which makes it difficult for an attacker to attack a connection link, so that the input proxy can protect heterogeneous functional equivalents through encapsulation, the predictability of a defense behavior of the apparatus can be greatly decreased, and the security of the network apparatus can be improved.

In an alternative embodiment, the input proxy 10 is further configured to receive a first dis-cooperation policy, which is included in the proxy policy. The dis-cooperation policy is used to filter and modify service requests received by the input proxy. The content in the adaptation policy includes a minimization template, which may be preset and is used to filter external service requests. The preset minimization template includes a number of filtering conditions, e.g., transmission protocol standard, interface specification of heterogeneous functional equivalents, requirement of protocol specification, whether a service request is a dangerous attacking service request, whether a service is an invalid service request without substantial content, and the like.

When receiving at least two service requests from the external, the input proxy 10 filters out, based on the first dis-cooperation policy and the minimization template in the adaptation policy, communication connections, or service requests that does not match the content of the minimization template, or protocol fields that does not match the external service requests, so as for the input proxy 10 to obtain valid service requests.

The unmatched service request includes a service request having a different transmission protocol or having been attacked, a service request including an unnecessary protocol/message, or a service request being attacked.

In this embodiment, service requests are filtered based on the first dis-cooperation policy, so as to select the service requests satisfying conditions in the minimization template, which can prevent an attacking service request from attacking a heterogeneous functional equivalent, improves security and defensibility of the apparatus. Further, the apparatus is prevented, through filtering, from serving an invalid service request, and thereby service efficiency of the apparatus is increased and a network resource is saved.

Preferably, the input proxy 10 is further configured to modify the content in the service request based on the first dis-cooperation policy, so as to match it with the heterogeneous functional equivalents. The content in the service request includes a domain name and a protocol rule. The content in the service request includes any one of a communication connection, message content, a data format, a message order, an initial time, a delay and a rate.

If a domain name or a protocol rule of a current service request received by the input proxy 10 does not match or is incompatible with selected heterogeneous functional equivalents, or the service request has low defensibility, the service request is correspondingly modified based on a modification function in the first dis-cooperation policy. For example, a domain name address or a protocol of the service request may be modified, so as for the service request to establish communication connections with a heterogeneous functional equivalent group. The modification further includes encrypting the service request to enhance the defensibility of the service request, thereby preventing the service request from being detected by an attacker.

Alternatively, before establishing communication connections to the selected heterogeneous functional equivalents, the input proxy 10 is further configured to manage a cooperation relationship between each heterogeneous functional equivalent and the outside of the apparatus based on the first dis-cooperation policy. The management includes maintaining a communication connection between the outside and the inside of the apparatus, receiving and sending service requests, filtering or modifying message content in a service request or other operations, isolating information exchange between every two heterogeneous functional equivalents, and shielding signal transmission between each heterogeneous functional equivalent and the outside of the apparatus.

In order to ensure service efficiency and reduce the time for outputting a service response, before the heterogeneous functional equivalents operate, it is necessary to isolate a heterogeneous functional equivalent from each other, and shield signal transmission between each heterogeneous functional equivalent and other devices outside the apparatus, so that the heterogeneous functional equivalent can be maintained in an idle and available state and started immediately without being affected by other factors when receiving the service request sent by the input proxy 10.

Further, a specific process of shielding communication between the heterogeneous functional equivalents and the outside of the apparatus by the input proxy 10 is as follows.

The input proxy 10 obtains a structure change mode of the heterogeneous functional equivalents.

A structure change mode may be understood as a change mode of a selection of the number of heterogeneous functional equivalents and an organizational structure relationship therebetween. That is, at least three heterogeneous functional equivalents may be selected at the same time for parallel execution (a decision mode), at least one monitoring executor may be periodically or aperiodically selected for execution in parallel with a working executor (a monitoring mode), or a working heterogeneous functional equivalent may be randomly selected periodically or aperiodically for execution (a random scheduling mode).

It is determined, based on the first dis-cooperation policy, whether a structure change mode of each heterogeneous functional equivalent is one of preset modes, where the preset modes include the decision mode, the monitoring mode, and the random scheduling mode.

In the decision mode, the apparatus runs at least three working heterogeneous functional equivalents at the same time, and performs input adaptation and output decision and normalization. In the monitoring mode, the apparatus runs at least one monitoring heterogeneous functional equivalent periodically, and runs at least one long-running working heterogeneous functional equivalent, where the monitoring heterogeneous functional equivalent periodically or aperiodically monitors and normalizes an output of the working heterogeneous functional equivalent. In the random scheduling mode, the apparatus runs at least two working heterogeneous functional equivalents at the same time, and randomly selects an output of a working heterogeneous functional equivalent periodically or aperiodically for output and normalization.

If the structure change mode belongs to one of the preset modes, signal transmission between each heterogeneous functional equivalent and the outside of the apparatus is shielded according to a rule corresponding to the preset mode.

The rule corresponding to the preset mode includes a first predetermined rule, a second predetermined rule, and a third predetermined rule, which respectively correspond to the decision mode, the monitoring mode, and the random scheduling mode. According to the first predetermined rule, the apparatus selects outputs of at least three working heterogeneous functional equivalents at the same time for decision and normalization. According to the second predetermined rule, the apparatus periodically selects at least one monitoring heterogeneous functional equivalent to monitor and normalize an output of a working heterogeneous functional equivalent. According to the third predetermined rule, the apparatus randomly selects an output of a working heterogeneous functional equivalent periodically or aperiodically for output and normalization.

Further, in the foregoing embodiment, the apparatus further includes an output proxy 20, and the proxy policy further includes a normalization policy, where the normalization policy is used to select a service response of one heterogeneous functional equivalent and output the service response to the outside.

The output proxy 20 is configured to receive the service responses output by the heterogeneous functional equivalents.

The redundancy controller 40 is further configured to send the normalization policy to the output proxy.

The output proxy 20 is further configured to select one of the received service responses as a target service response based on the normalization policy, establish a communication connection between the target service response and the outside of the apparatus, and output the target service response via the established communication connection.

Specifically, when selecting the target service response based on the normalization policy, the output proxy 20 is further configured to: select content of an external receive end of the apparatus or a service request matching the content of the preset minimization template, and use the service request as the target service request, where the content includes one of a communication connection, message content, a data format, a message order, an initial time, a delay and a rate.

In this embodiment, the output proxy 20 selects, based on the normalization policy, one from a plurality of service responses as a target service response and output the target service response, so as for an output service response to have a higher quality, and thereby service quality is ensured. In addition, as seen from the outside of the apparatus, it is difficult to recognize and identify which heterogeneous functional equivalent outputs the service response to the outside, which achieves the aim of encapsulating heterogeneous functional equivalents in the apparatus, can hide or conceal an abnormal running state of a heterogeneous functional equivalent, greatly decreases predictability of a defense behavior of the apparatus, and thereby improves security of the apparatus.

Preferably, the proxy policy further includes a second dis-cooperation policy. The second dis-cooperation policy corresponds to the first dis-cooperation policy. That is, if the first dis-cooperation policy includes a function of filtering service requests, the second dis-cooperation policy includes a function of correspondingly complementing content filtered out by the first dis-cooperation policy. If the first dis-cooperation policy includes service request modification, e.g., an encryption operation, when the target service response is output, the target service response needs to be restored based on the second dis-cooperation policy, that is, a decryption operation is performed on the target service response, so that the output service response is consistent with the input service request.

Specifically, if the target service response is obtained based on the first dis-cooperation policy and filtering processing is performed on the service request, the content of the target service response is complemented based on the second dis-cooperation policy before the target service request is output. The complemented content includes: a service response or a protocol field in a service response that does not match the first dis-cooperation policy and the content of the minimization template.

If the target service response is obtained based on the first dis-cooperation policy and modification processing is performed on the service request, the content of the target service response is restored based on the second dis-cooperation policy, so that the content of the target service response is consistent with the service request before modification. The restored content includes one of a communication connection, message content, a data format, a message order, an initial time, a delay and a rate.

In addition, the output proxy 20 is further configured to manage a cooperation relationship between the heterogeneous functional equivalents and the outside of the apparatus based on the second dis-cooperation policy, isolate information exchange between the heterogeneous functional equivalents, and block signal transmission between each heterogeneous functional equivalent and the outside of the apparatus, after the output proxy 20 receives the service responses output by the heterogeneous functional equivalents.

It should be noted that, in the foregoing embodiment, the redundancy controller 40 is further configured to send a restart instruction to an abnormal heterogeneous functional equivalent, or perform policy-based cleaning, resetting, or the like, on a heterogeneous functional equivalent. The "policy-based cleaning" includes: clearing a cache, clearing a configuration file, etc. The "resetting" means initializing the apparatus.

In addition, the redundancy controller 40 implements service management on heterogeneous functional equivalents through the input/output proxy, which includes controlling the input proxy to allocate a service request to heterogeneous functional equivalents, controlling the output proxy to select a service response for output, synchronizing a state or data between heterogeneous functional equivalents, etc.

The input proxy 10 and the redundancy controller 40 are applied to an internal implementation structure of a plurality of heterogeneous functional equivalents encapsulated in parallel, so as to implement normalized input and output. The input proxy 10 is configured to receive an external service function request, and determine heterogeneous executors for providing a service for the service function request. The output proxy 20 receives feedbacks of these heterogeneous executors, and outputs a service response based on the feedbacks and a proxy policy given by the redundancy controller 40. The service request may be an instruction initiated by a user to a software/hardware apparatus 100 by using a computer. For example, when the apparatus 100 completes routing and addressing, the service request is a destination IP address of a data packet; when the apparatus 100 completes data exchange, the service request is a source/destination link layer address of a data packet; when the apparatus 100 completes data encryption, the service request is plaintext data and a key; when the apparatus 100 completes domain name resolution/reverse resolution, the service request is domain name data/IP address.

In addition, the scale of and the means employed by the heterogeneous executor are not limited, which may be a system, a subsystem, a module, a function, a middleware, a component, etc.

Encapsulation of heterogeneous executors includes, but not limited to, the following aspects:

1. encapsulation of interaction interfaces, e.g., encapsulation of various normalizable standards, interfaces, protocol specifications, or the like;

2. encapsulation of communication states, e.g., encapsulation of state information such as communications interface, connection identifier, and mapping relationship between internal and external connections; and 3. encapsulation of control relationships, e.g., encapsulation of exterior structure characterizations, minimized encapsulation of control information, encapsulation of segmented/layered check and decision of control message, or the like.

That is, under the condition of functional equivalence, the apparatus shields an exterior structure characterization change caused by changes in combination scheduling of heterogeneous functional equivalents and I/O structure outwards, and minimizes control information required by input/output and distributes and decides interaction control messages in a layered and segmented manner inwards, so that the outside cannot detect an indeterminate structure characterization of a given service function encapsulated by the apparatus. The apparatus supports exterior normalized presentation and interior dis-cooperation, and performs strict information input/output proxying for each interaction to cut a communication link of an attacker, such that it is difficult for the attacker to sniff and exploit unknown defects or backdoors, thereby decreasing a success rate of the attacker attacking the information system.

Figure 2:
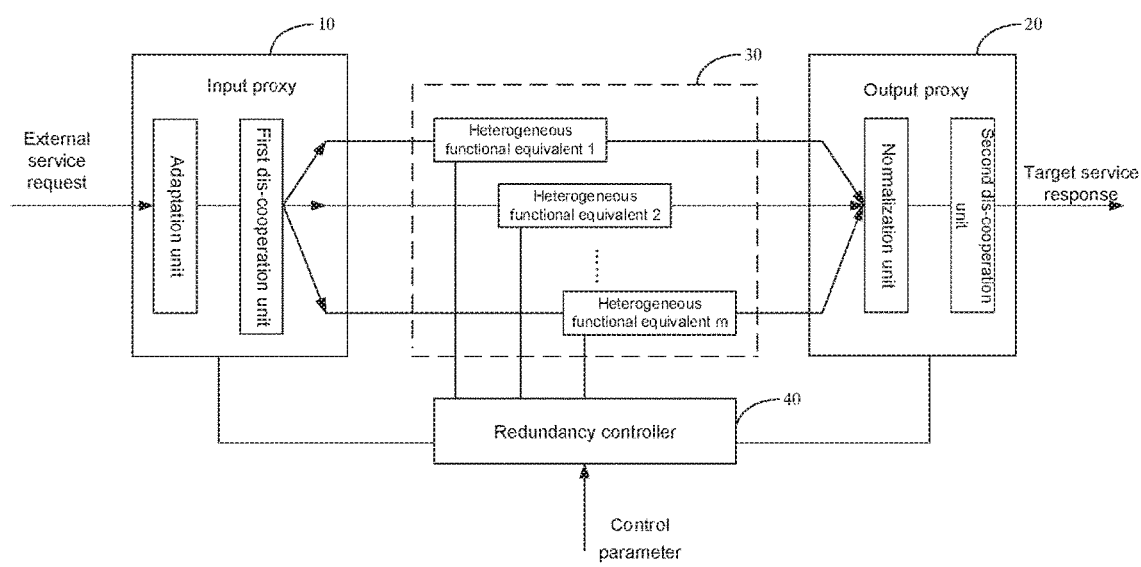
FIG. 2 is a schematic structural diagram of another apparatus for encapsulating heterogeneous functional equivalents according to an embodiment of this application.

In another embodiment of the present disclosure, as shown in FIG. 2, the input proxy 10 further includes a first dis-cooperation unit and an adaptation unit. The adaptation unit is configured to perform the function of adapting heterogeneous functional equivalents, and establish the communication connections to the selected heterogeneous functional equivalents. The first dis-cooperation unit is configured to perform the function corresponding to the dis-cooperation policy, e.g., filtering and modifying external service requests, and shielding and isolating different heterogeneous functional equivalents from each other.

The output proxy 20 further includes: a normalization unit and a second dis-cooperation unit. The normalization unit is configured to normalize interaction interfaces between the outside of the information system and the heterogeneous functional equivalents, select a service response as a target service response, and output the target service response. The second dis-cooperation unit is configured to maintain communication states of the heterogeneous functional equivalents, and manage an dis-cooperation relationship between the outside of the information system and the heterogeneous functional equivalents or between the heterogeneous functional equivalents.

The input proxy 10 and the output proxy 20 terminate inward and outward communication connections, and maintain a communication state between the outside of the information system and the heterogeneous functional equivalents.

The step of maintaining a communication state by the input/output proxy includes:

the input proxy/output proxy terminates an communication connection from outside/inside of the information system, and maintains state information such as a communications interface and a connection identifier;

the input proxy establishes communication connections to heterogeneous functional equivalents one by one based on an external service request, and maintains state information such as a communications interface, a connection identifier, a mapping relationship between internal and external connections;

the output proxy establishes a communication connection to the outside of the information system based on an internal service request, and maintains state information such as a communications interface, a connection identifier, and a mapping relationship between internal and external connections; and the input proxy/output proxy receives communication data from an internal communication connection and sends the communication data to an external communication connection, or receives communication data from an external communication connection, and sends the communication data to an internal communication connection.

As shown in FIG. 2, the input proxy 10 and the output proxy 20 perform, based on interaction interfaces, bidirectional normalization conversion is performed between a specific data structure format of the outside of the information system and the heterogeneous functional equivalents and a predetermined data structure format. The interaction interfaces include various standards or normalizable interfaces and protocol specifications.

The step of normalizing interaction interfaces by the input/output proxy includes:

For an interaction process initiated from outside of the information system, the adaptation unit of the input proxy 10 converts information in the specific data structure format outside the information system into information in the predetermined data structure format;

the adaptation unit of the input proxy 10 sends the information in the adapted data structure format to the first dis-cooperation unit for processing, so that a service request processed by the first dis-cooperation unit matches heterogeneous functional equivalents;

the normalization unit of the output proxy 20 obtains information in specific data structure format from the heterogeneous functional equivalents, and converts it into information in a normalized data structure format; and the normalization unit of the output proxy 20 sends the information in the normalized data structure format to the second dis-cooperation unit for processing, so that a service response processed by the second dis-cooperation unit matches a receive end outside the apparatus, where their information transmissions are compatible with each other, and their data formats are the same.

For an interaction process initiated inside the information system or apparatus, the normalization unit of the output proxy 20 obtains information in specific data structure format from heterogeneous functional equivalents, and converts it into information in normalized data structure format;

the normalization unit of the output proxy 20 sends the information in the normalized data structure format to the dis-cooperation unit for processing; and the normalization unit of the output proxy 20 obtains the information in the normalized data structure format from the dis-cooperation unit, and converts it into information in a specific data structure format outside the information system.

As shown in FIG. 2, the input proxy 10 and the output proxy 20 manage dis-cooperation relationships. The dis-cooperation management includes shielding changes in exterior structure characterization caused by changes in combination scheduling and structure of heterogeneous functional equivalents, minimizing control information input to the heterogeneous functional equivalents or output to outside of the information system, and checking/deciding interaction control messages between the outside of the information system and the heterogeneous functional equivalents in a layered and segmented manner.

The step of managing dis-cooperation relationships by the input proxy 10 and the output proxy 20 includes:

the dis-cooperation unit of the input proxy 10/output proxy 20 shields change(s) in exterior structure characterization of the information system due to change(s) in the structure of heterogeneous functional equivalents;

the dis-cooperation unit of the input proxy 10/output proxy 20 minimizes control information input to the heterogeneous functional equivalents or output to the outside of the information system; and the dis-cooperation unit of the input proxy 10/output proxy 20 checks/decides interaction control messages between the outside of the information system and the heterogeneous functional equivalents in a layered and segmented manner.

In the apparatus for encapsulating heterogeneous functional equivalents provided in this embodiment, the input proxy/output proxy can maintain, based on the proxy policy and the external service request of the information system, communication states between the outside of the information system and heterogeneous functional equivalents, normalize interaction interfaces between the outside of the information system and the heterogeneous functional equivalents, manage dis-cooperation relationships between outside of the information system and the heterogeneous functional equivalents, allocate the external service request to these heterogeneous functional equivalents, and output a service response of a target heterogeneous functional equivalent. Therefore, interior structures of a plurality of heterogeneous functional equivalents are hidden so that the entire information system is presented outwards in a normalized manner, and an abnormal running state of a heterogeneous functional equivalent is well hidden or concealed, which greatly decreases predictability of a defense behavior of the apparatus, and makes it difficult for an attacker to sniff and exploit trapdoors (backdoors) or vulnerabilities (defects) loaded in cyberspace due to loss of accessibility.

In addition, dis-cooperation is achieved among the heterogeneous functional equivalents, which cuts a cooperative attack link against trapdoors (backdoors) or vulnerabilities (defects) at a same location of a plurality of heterogeneous functional equivalents, and thus decreases a success rate of an attacker attacking the information system.

In another embodiment of this application, the software/hardware apparatus supports iterative application. That is, for a plurality of functionally equivalent heterogeneous executors and service sub-function units therein at any layer, and for the redundancy controller 40 and a service sub-function unit therein at any layer, the same method used by the apparatus 100 may be used, thereby enhancing the indeterminacy between service function and structure characterization of the apparatus.

Figure 3:
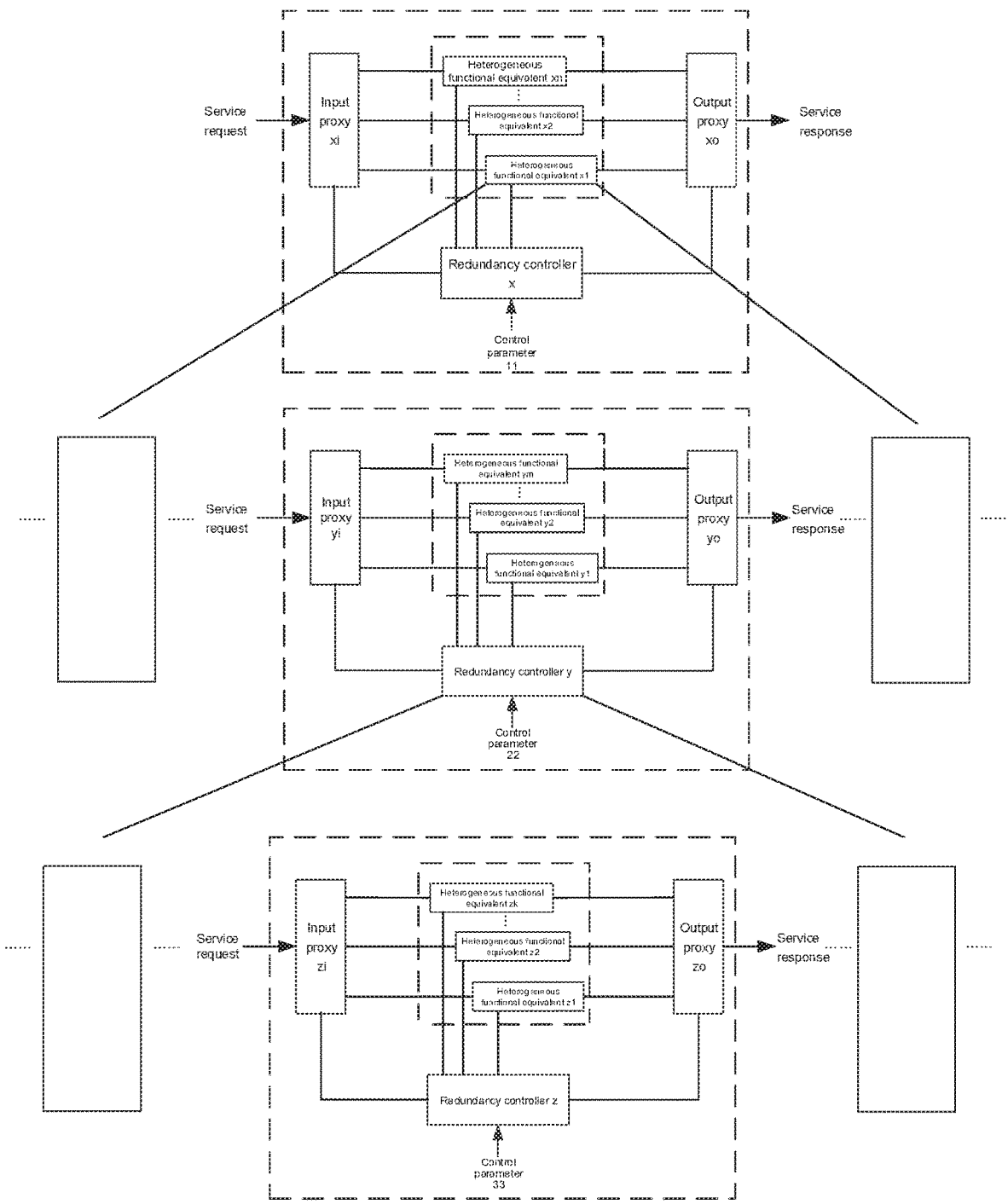
FIG. 3 is a schematic diagram illustrating iterative application of a software/hardware apparatus with an indeterminate service function and structure characterization according to an embodiment of this application.

As shown in FIG. 3, the first layer of the apparatus 100 includes a redundancy controller 11, a redundancy controller x and n functionally equivalent heterogeneous executors (numbered x1, x2, . . . , and xn), where each of the heterogeneous executors x1, x2, . . . , and xn may be further divided based on function, and a service sub-function may use the same method as the apparatus 100. For example, the heterogeneous executor xn at the first layer may be divided into a second layer including a redundancy controller 22, a redundancy controller y, and m functionally equivalent heterogeneous executors (numbered y1, y2, . . . , and ym) at a second layer, where the redundancy controller y is connected to the redundancy controller 11 and a plurality of heterogeneous executors (y1, y2, . . . , and ym). Moreover, the redundancy controller 11 has a same function the redundancy controller 40 at the first layer, the redundancy controller y has a same function as the redundancy controller x, and the plurality of heterogeneous executors (y1, y2, . . . , and ym) take a same form as the plurality of heterogeneous executors (x1, x2, . . . , and xn).

Further, it is assumed that the heterogeneous executor y2 may also be further divided based on function, and a service sub-function also uses the same method as the apparatus 100. Then a third layer including a redundancy controller 33, a redundancy controller z, and k heterogeneous executors (numbered z1, z2, . . . , and zk) is obtained, the connection structure and function of which is the same as the first layer or second layer of the apparatus 100. In the foregoing process, three-layer iteration of the apparatus 100 is achieved, and an iteration of a fourth layer, a fifth layer . . . can be further obtained. Generally, at a software level, a number of the last layer at which iteration is performed is a binary number, and the iteration capability of the apparatus in this application depends on a division granularity of a given service function and a size of a heterogeneous space.

Being the same as the plurality of functionally equivalent heterogeneous executors and service sub-function units therein at any layer, the redundancy controller may have an iteration function to enhance the indeterminacy between service function and structure characterization of the apparatus. Alternatively, the redundancy controller may not have an iteration function.

Figure 4:
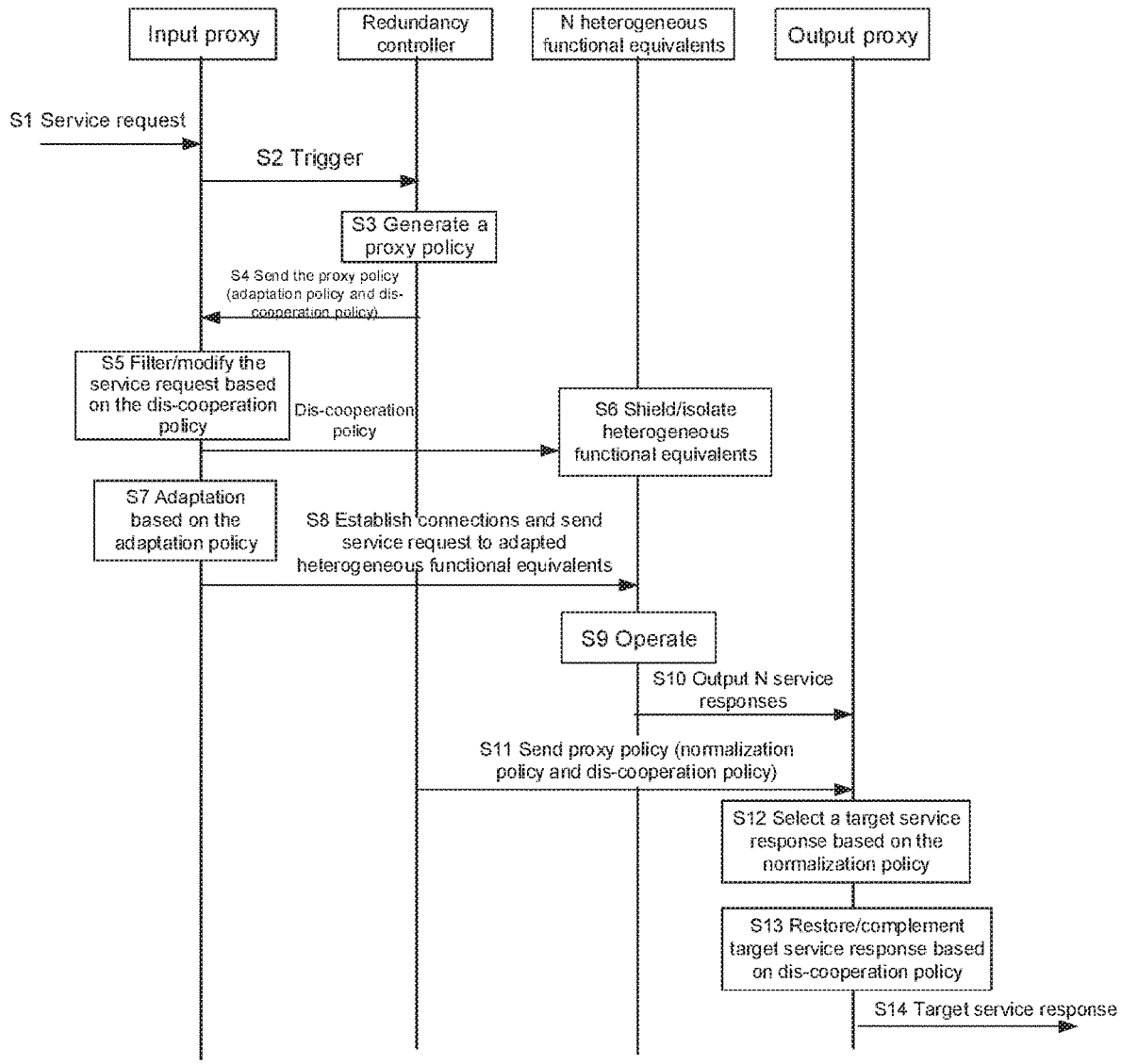
FIG. 4 is a flowchart of a method for encapsulating heterogeneous functional equivalents according to an embodiment of this application.

As shown in FIG. 4, this application further provides a method for encapsulating heterogeneous functional equivalents. Specifically, the method includes the following steps:

Step S1: An input proxy receives one or more external service requests.

Step S2: The input proxy sends a trigger signal to a redundancy controller after receiving the service request.

Step S3: The redundancy controller generates a proxy policy based on a control parameter after receiving the trigger signal. The proxy policy includes an adaptation policy, a dis-cooperation policy, and a normalization policy. The dis-cooperation policy includes a first dis-cooperation policy and a second dis-cooperation policy. The first dis-cooperation policy is allocated to the input proxy, and used to filter and modify service requests received by the input proxy. The second dis-cooperation policy is allocated to an output proxy, and used to complement and restore a target service response output by the output proxy. In this way, as seen from outside of the entire apparatus, the input service request matches (or has a consistent content with) the output service response.

Step S4: The redundancy controller sends the adaptation policy and the first dis-cooperation policy in the generated proxy policy to the input proxy.

Step S5: The input proxy receives the adaptation policy and the first dis-cooperation policy, and performs filtering and modification operations on the received service requests based on the first dis-cooperation policy.

Step S6: The input proxy sends the first dis-cooperation policy to N heterogeneous functional equivalents, isolates information exchange between every two heterogeneous functional equivalents, and shields signal transmission between each heterogeneous functional equivalent and outside of the apparatus.

Step S7: The input proxy selects, based on the adaptation policy, heterogeneous functional equivalents for providing a service for the service request.

Step S8: The input proxy establishes communication connections to the selected heterogeneous functional equivalents, and respectively sends the service request to these heterogeneous functional equivalents via the established communication connections.

Step S9: The selected heterogeneous functional equivalents receive the service request from the input proxy and operate.

Step S10: The heterogeneous functional equivalents receiving the service request output service responses, and sends the service responses to the output proxy.

Step S11: The redundancy controller sends the normalization policy and the second dis-cooperation policy to the output proxy.

Step S12: The output proxy receives the service responses output by the heterogeneous functional equivalents, receives the normalization policy and the second dis-cooperation policy sent by the redundancy controller, and selects one from the received service responses as a target service response based on the normalization policy.

Step S13: The output proxy restores and complements the target service response based on the second dis-cooperation policy, so that the target service response matches the input service request.

Step S14: The output proxy establishes a communication connection between the target service response and outside of the apparatus, and outputs the target service response.

Figure 5:
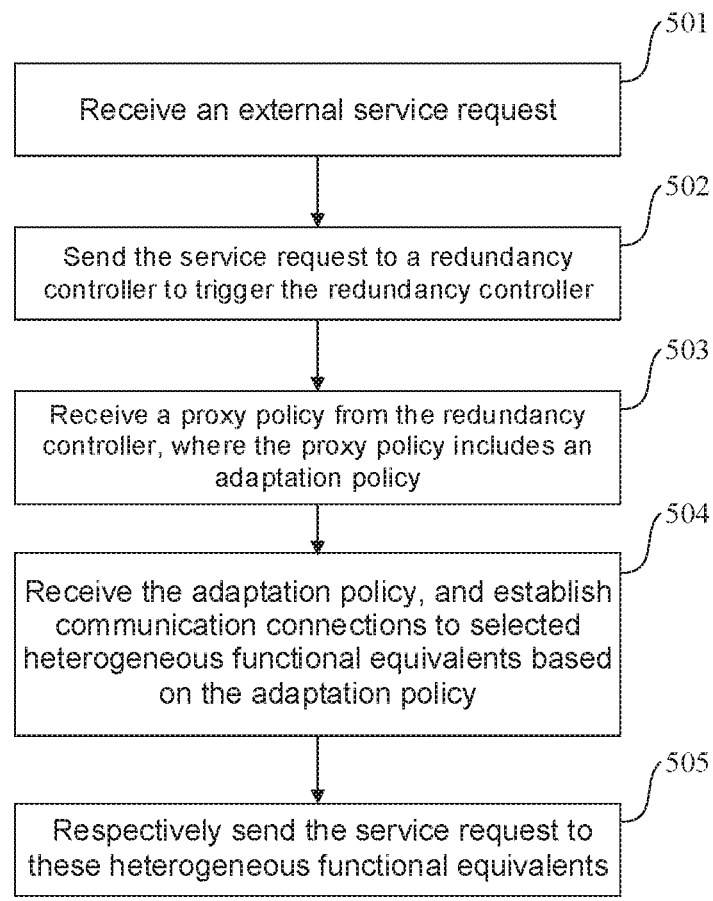
FIG. 5 is a flowchart of another method for encapsulating heterogeneous functional equivalents according to an embodiment of this application.

Corresponding to the procedure of the apparatus, this application further provides a method for encapsulating heterogeneous functional equivalents, which is applied to an input proxy. As shown in FIG. 5, the method includes the following steps:

Step 501: An input proxy receives an external service request.

Step 502: The input proxy sends the service request to a redundancy controller to trigger the redundancy controller.

Step 503: The input proxy receives a proxy policy sent by the redundancy controller, where the proxy policy is generated based on a control parameter, and includes an adaptation policy and a first dis-cooperation policy.

Step 504: The input proxy receives the adaptation policy, and establishes communication connections to selected heterogeneous functional equivalents based on the adaptation policy.

Alternatively, establishing communication connections to the selected heterogeneous functional equivalents based on the adaptation policy includes:

Selecting, based on content in the service request and the adaptation policy, heterogeneous functional equivalents matching the content as heterogeneous functional equivalents for providing a service, and establishing communication connections to these matched heterogeneous functional equivalents, where the content includes one of a communication connection, message content, a data format, a message order, an initial time, a delay and a rate, and the adaptation policy includes one of a communication connection, message content, a data format, a message order, an initial time, a delay and a rate of each heterogeneous functional equivalent.

Step 505: Respectively sending the service request to these heterogeneous functional equivalents via the communication connections.

Further, before the establishment of communication connections to selected heterogeneous functional equivalents in step 504, the method further includes:

managing a cooperation relationship between each heterogeneous functional equivalent and outside of the apparatus based on the first dis-cooperation policy;

isolating information exchange between every two heterogeneous functional equivalents; and shielding signal transmission between each heterogeneous functional equivalent and outside of the apparatus.

Figure 6:
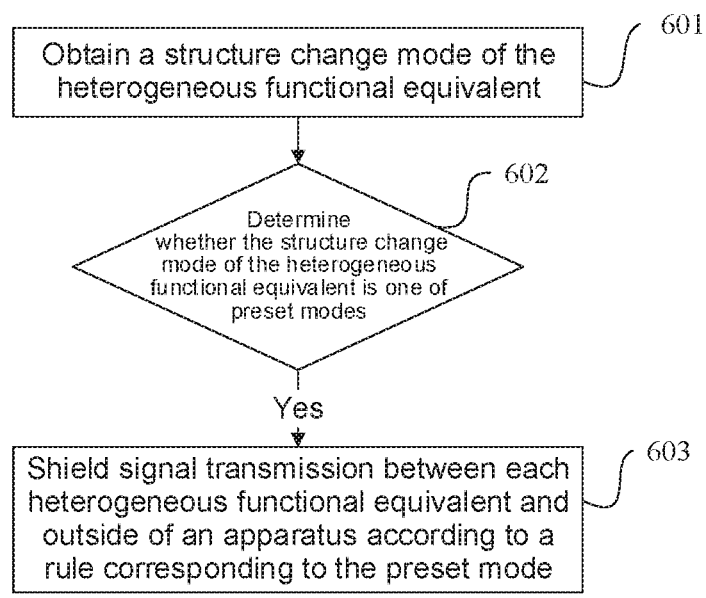
FIG. 6 is a flowchart of a method for shielding heterogeneous functional equivalents according to an embodiment of this application.

Preferably, as shown in FIG. 6, shielding signal transmission between each heterogeneous functional equivalent and outside of the apparatus includes the following steps:

Step 601: The input proxy obtains structure change modes of the heterogeneous functional equivalents.

Step 602: Determine whether the structure change mode of the heterogeneous functional equivalent is one of preset modes, where the preset modes include a decision mode, a monitoring mode, and a random scheduling mode.

In the decision mode, the apparatus simultaneously runs at least three working heterogeneous functional equivalents, and performs input adaptation and output decision/normalization. In the monitoring mode, the apparatus runs at least one monitoring heterogeneous functional equivalent periodically, and runs at least one long-running working heterogeneous functional equivalent, where the monitoring heterogeneous functional equivalent periodically or aperiodically monitors and normalizes an output of the working heterogeneous functional equivalent. In the random scheduling mode, the apparatus runs at least two working heterogeneous functional equivalents at the same time, and randomly selects an output of a working heterogeneous functional equivalent periodically or aperiodically for output and normalization.

Step 603: If the structure change mode is one of the preset modes, shielding signal transmission between each heterogeneous functional equivalent and outside of the apparatus according to a rule corresponding to the preset mode. If the structure change mode is not one of the preset modes, shielding and isolating the heterogeneous functional equivalents according to a default mode, so as to ensure that quantity, types, and working states of heterogeneous functional equivalents in the apparatus cannot be known to the outside of the apparatus, i.e., only those service requests having been processed by the adaptation policy and the dis-cooperation policy can be input to the heterogeneous functional equivalents, and only those service responses having been processed by a normalization policy and a dis-cooperation policy can be output.

Figure 7:
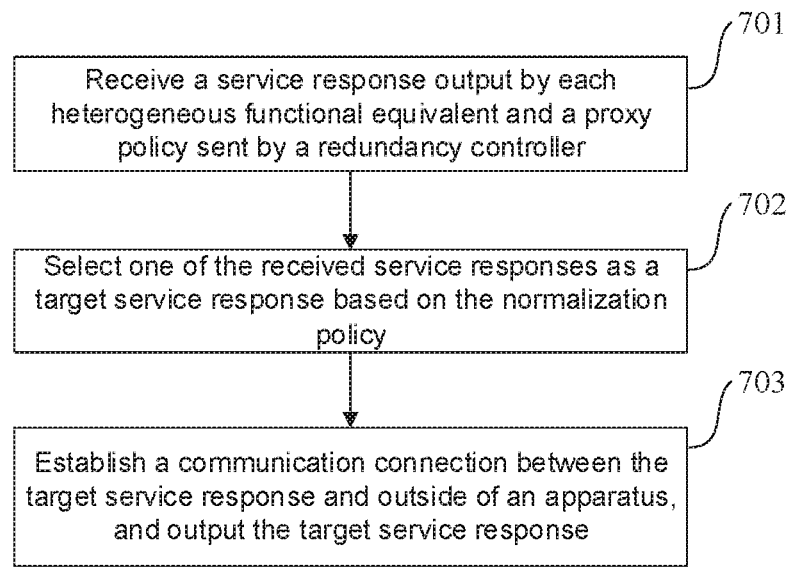
FIG. 7 is a flowchart of still another method for encapsulating heterogeneous functional equivalents according to an embodiment of this application.

In another method embodiment, as shown in FIG. 7, a method for encapsulating heterogeneous functional equivalents, which is applied to an output proxy on an output side, includes the following steps:

Step 701: Receiving, by an output proxy, service responses output by the heterogeneous functional equivalents, and a proxy policy sent by a redundancy controller, where the proxy policy includes a normalization policy.

Step 702: Selecting one of the received service responses as a target service response based on the normalization policy.

Step 703: Establishing a communication connection between the target service response and outside of the apparatus, and outputting the target service response, where the apparatus includes the redundancy controller, the output proxy, and at least two heterogeneous functional equivalents with a same function.

Further, selecting one of the received service responses as a target service response based on the normalization policy includes: selecting a service request matching content of an external receive end of the apparatus or content of a minimization template from the received service responses based on the normalization policy, and using the service response as the target service request, where the content includes one of a communication connection, message content, a data format, a message order, an initial time, a delay and a rate.

Further, after step 702, if the proxy policy further includes a second dis-cooperation policy and the second dis-cooperation policy corresponds to the first dis-cooperation policy, after receiving service responses output by the heterogeneous functional equivalents, the method further includes:

receiving the second dis-cooperation policy sent by the redundancy controller; and if the target service response is obtained based on the first dis-cooperation policy and filtering processing is performed on the service request, complementing content of the target service response based on the second dis-cooperation policy before outputting the target service request, where the complemented content includes: a service response or a protocol field in a service response not matching the first dis-cooperation policy and content of the preset minimization template, and further includes content such as a communication connection, a service response, and a message, or the like.

After outputting the target service response, the method further includes:

if the target service response is obtained based on the first dis-cooperation policy and modification processing is performed on the service request, restoring the content of the target service response based on the second dis-cooperation policy, so that the content of the target service response is consistent with the service request before modification, where the restored content includes one of a communication connection, message content, a data format, a message order, an initial time, a delay and a rate.

Further, after receiving, by the output proxy, service responses output by the heterogeneous functional equivalents, the method further includes:

managing a cooperation relationship between each heterogeneous functional equivalent and outside of the apparatus based on the second dis-cooperation policy;

isolating information exchange between the heterogeneous functional equivalents; and shielding signal transmission between each heterogeneous functional equivalent and outside of the apparatus.

Shielding signal transmission between each heterogeneous functional equivalent and outside of the apparatus includes:

obtaining structure change modes of the heterogeneous functional equivalents;

determining, based on the second dis-cooperation policy, whether the structure change modes of the heterogeneous functional equivalents belong to one of preset modes, where the preset mode include a decision mode, a monitoring mode, and a random scheduling mode; and if the structure change modes belong to one of the preset modes, shielding a service request, which may leak currently used preset mode, between each heterogeneous functional equivalent and outside of the apparatus according to a rule corresponding to the preset mode.

In the method for encapsulating heterogeneous functional equivalents provided in the embodiments of the present invention, an input proxy receives a proxy policy sent by a redundancy controller, maintains communication states between outside of an information system and heterogeneous functional equivalents based on the proxy policy and an service request from outside of the information system, normalizes interaction interfaces between outside of the information system and the heterogeneous functional equivalents, manages dis-cooperation relationships between outside of the information system and the heterogeneous functional equivalents, and allocates the service request from the outside to these heterogeneous functional equivalents. The redundancy controller generates the proxy policy, including a state maintaining policy, a normalization policy and a dis-cooperation policy, based on an control parameter sent from outside or preset inside, and sends the policy to the input/output proxy. The output proxy receives the proxy policy sent by the redundancy controller, maintains communication states between the heterogeneous functional equivalents and the outside of the information system based on the proxy policy and outputs of the heterogeneous functional equivalents, normalizes interaction interfaces between the heterogeneous functional equivalents and the outside of the information system, manages dis-cooperation relationships between the heterogeneous functional equivalents and the outside of the information system, and outputs a service response of a target heterogeneous functional equivalent.

In addition, by encapsulating the heterogeneous functional equivalents, the indeterminacy in characterization caused by a change in structure characterization of the heterogeneous functional equivalents is hidden, so that an abnormal running state of a heterogeneous functional equivalent can be well hidden, which greatly decreases the predictability of a defense behavior of an apparatus.

Compared with the prior art, service functions of a plurality of heterogeneous functional equivalents are encapsulated in this solution, so that an apparatus supports outward normalized presentation and inward dis-cooperation, and performs strict information input/output proxying in each interaction to cut a communication link employed by an attacker, so that it is difficult for the attacker to sniff and exploit unknown defects or backdoors, and a success rate of the attacker attacking the information system is reduced.

Further, if the proxy policy includes a dis-cooperation policy, the method further includes:
managing, by the input proxy, dis-cooperation relationships between outside of the apparatus and the heterogeneous functional equivalents, and managing, by the output proxy, dis-cooperation relationships between the heterogeneous functional equivalents and outside of the apparatus.

The dis-cooperation management includes shielding the change in exterior structure characterization of an information system caused by the change in combination scheduling/structure transformation of heterogeneous functional equivalents, minimizing control information input to the heterogeneous functional equivalents or output to outside of the information system, and checking/deciding interaction control messages between outside of the information system and the heterogeneous functional equivalents in a layered and segmented manner.

Further, the method further includes:
terminating communication connections from outside or inside of the information system, and maintaining state information such as a communications interface and a connection identifier;
establishing, by the input proxy, communication connections to heterogeneous functional equivalents one by one based on an external service request, and maintaining communications interface and connection identifier, as well as a mapping relationship between internal and external connections;
establishing, by the output proxy, a communication connection to outside of the information system based on an internal service request, and maintaining communications interface, connection identifier, and mapping relationship between internal and external connections; and
receiving communication data from an internal communication connection, and sending the communication data to an external communication connection; or receiving communication data from an external communication connection, and sending the communication data to an internal communication connection.

In another embodiment, this application further provides a system for encapsulating heterogeneous functional equivalents, which includes the apparatus for encapsulating heterogeneous functional equivalents as provided in the foregoing embodiment and at least two heterogeneous functional equivalents, where
the apparatus for encapsulating heterogeneous functional equivalents is configured to encapsulate the heterogeneous functional equivalents, so that an input proxy and an output proxy can terminate inward or outward communication connections, and maintain communication states between outside of the apparatus or information system and the heterogeneous functional equivalents.

Figure 8:
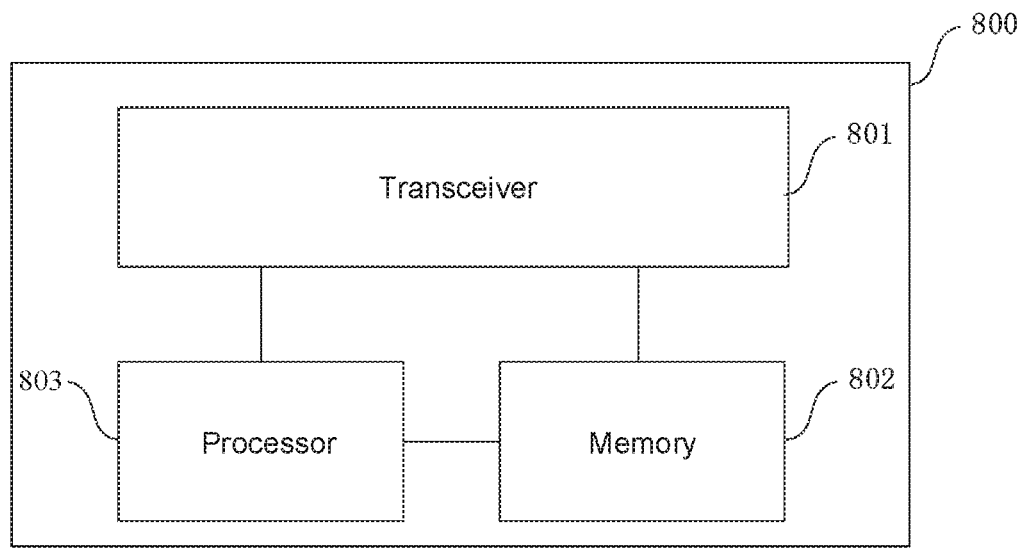
FIG. 8 is a schematic structural diagram of a device for encapsulating heterogeneous functional equivalents according to an embodiment of this application.

Corresponding to the foregoing embodiments of the method and apparatus, as for specific hardware implementation, this application further provides a device for encapsulating heterogeneous functional equivalents. As shown in FIG. 8, the device includes a transceiver 801, a processor 803, and a memory 802.

The transceiver 801 is configured to receive an external service request and a proxy policy, where the proxy policy includes an adaptation policy, a normalization policy, a first dis-cooperation policy, and a second dis-cooperation policy, the first dis-cooperation policy corresponding to the second dis-cooperation policy.

The processor 803 is configured to establish communication connections to selected heterogeneous functional equivalents based on the adaptation policy, and respectively send the service request to these heterogeneous functional equivalents via the communication connections.

The memory 802 is configured to store the service request and the proxy policy.

Further, the transceiver 801 is further configured to receive output responses of the heterogeneous functional equivalents, where the selected heterogeneous functional equivalents operate based on the service request and then output the output responses; and
the processor 803 is further configured to select one of the received service responses as a target service response based on the normalization policy, establish a communication connection between the target service response and outside of the apparatus, and output the target service response.

Further, on an input side of the device, the processor 802 is further configured to filter out, based on the first dis-cooperation policy and a minimization template in the adaptation policy, communication connections, or service requests not matching the content of the minimization template, or a protocol field not matching the external service request;

the processor 803 is further configured to modify the content in the service request based on the first dis-cooperation policy, so that the content in the service request matches heterogeneous functional equivalents, where the content in the service request includes one of a communication connection, message content, a data format, a message order, an initial time, a delay and a rate; and the processor 803 is further configured to manage a cooperation relationship between each heterogeneous functional equivalent and outside of the apparatus based on the first dis-cooperation policy, isolate information exchange between every two heterogeneous functional equivalents, and shield signal transmission between each heterogeneous functional equivalent and outside of the apparatus.

In addition, on an output side of the device, the processor 803 is further configured to: if the target service response is based on the first dis-cooperation policy and the service request is filtered, complement the content of the target service response based on the second dis-cooperation policy before the target service request is outputted, where the complemented content includes: a service response or a protocol field in a service response that does not match the first dis-cooperation policy and the content of the minimization template;

the processor 803 is further configured to: if the target service response is obtained based on the first dis-cooperation policy and the service request is modified, restore the content of the target service response based on the second dis-cooperation policy, so that the content of the target service response is consistent with the service request before modification, where the restored content includes one of a communication connection, message content, a data format, a message order, an initial time, a delay and a rate; and the processor 803 is further configured to: after selecting the target service response, manage a cooperation relationship between each heterogeneous functional equivalent and outside of the apparatus based on the second dis-cooperation policy, isolate information exchange between every two heterogeneous functional equivalents, and shield signal transmission between each heterogeneous functional equivalent and the outside of the apparatus.

In this embodiment, the processor 803 may be a central processing unit (CPU), a network processor (NP), or a combination thereof. The processor may further include a hardware chip. The hardware chip may be an application-specific integrated circuit (ASIC), a programmable logic device (PLD), or a combination thereof. The PLD may be a field-programmable gate array (FPGA), a generic array logic (GAL), or any combination thereof.

The memory 802 may be a volatile memory, a non-volatile memory, or a combination thereof. The volatile memory may be a random access memory (RAM). The non-volatile memory may be a read-only memory (ROM), a flash memory, a hard disk drive (HDD), or the like. The memory 802 is further configured to store application program code for performing the method of encapsulating the heterogeneous functional equivalents. The processor 803 is further configured to execute an application program stored in the memory 802. The transceiver 801 may further include a communication interface for enable the device for encapsulating the heterogeneous functional equivalents to communicate with another device.

An embodiment of this application further provides a computer storage medium, configured to store computer software instructions used by the apparatus for encapsulating the heterogeneous functional equivalents in the foregoing embodiment, which include a program designed to perform the method in the foregoing embodiments. Heterogeneous functional equivalents with a same function can be encapsulated by executing the stored program.

Persons skilled in the art may clearly understand that, the embodiments of this application may be implemented by mean of software in combination with a necessary general hardware platform. Based on such an understanding, the technical solutions in the embodiments of this application may be essentially presented, or the part of the technical solutions contributing to the prior art may be presented, in a form of a software product.

The foregoing descriptions are merely specific embodiments of this application. It should be noted that persons of ordinary skill in the art may make improvements or polishing without departing from the principle of this application, and such improvements or polishing shall fall within the protection scope of this application.

What is claimed is:

1. An apparatus for encapsulating heterogeneous functional equivalents, comprising an input proxy, a redundancy controller, and at least two heterogeneous functional equivalents with a same function, wherein the input proxy is configured to trigger the redundancy controller after receiving an external service request;

the redundancy controller is configured to generate a proxy policy based on a control parameter after being triggered by the input proxy, and send the proxy policy to the input proxy, wherein the proxy policy comprises an adaptation policy and a first dis-cooperation policy;

the input proxy is further configured to receive the adaptation policy, establish communication connections to selected heterogeneous functional equivalents based on the adaptation policy, and respectively send the service request to the selected heterogeneous functional equivalents via the communication connections; and the heterogeneous functional equivalents are configured to operate and output service responses after receiving the service request sent by the input proxy, wherein the input proxy is specifically configured to:

select, based on content in the service request and the adaptation policy, heterogeneous functional equivalents matching the content as heterogeneous functional equivalents for providing a service, and establish communication connections to the selected heterogeneous functional equivalents, wherein the content comprises one of a communication connection, message content, a data format, a message order, an initial time, a delay and a rate; and the adaptation policy comprises one of a communication connection, message content, a data format, a message order, an initial time, a delay and a rate of each heterogeneous functional equivalent.

2. The apparatus according to claim 1, wherein the input proxy is further configured to filter out, based on the first dis-cooperation policy and a minimization template in the adaptation policy, a communication connection, or a service request not matching content of the minimization template, or a protocol field not matching the external service request.

3. The apparatus according to claim 2, wherein the input proxy is further configured to modify content in the service request based on the first dis-cooperation policy, so that the content in the service request matches heterogeneous functional equivalents, wherein the content in the service request comprises one of a communication connection, message content, a data format, a message order, an initial time, a delay and a rate.

4. The apparatus according to claim 1, wherein the input proxy is further configured to manage a cooperation relationship between each heterogeneous functional equivalent and outside of the apparatus based on the first dis-cooperation policy, isolate information exchange between every two heterogeneous functional equivalents, and shield signal transmission between each heterogeneous functional equivalent and the outside of the apparatus, before establishing the communication connections.

5. The apparatus according to claim 4, wherein the input proxy is specifically further configured to:
  obtain structure change modes of the heterogeneous functional equivalents;
  determine, based on the first dis-cooperation policy, whether a structure change mode of each heterogeneous functional equivalent is one of preset modes, wherein the preset mode comprise a decision mode, a monitoring mode, and a random scheduling mode; and
  if the structure change mode is one of the preset modes, shield a service request, which can leak a current preset mode, between each heterogeneous functional equivalent and the outside of the apparatus according to a rule corresponding to the preset mode.

6. The apparatus according to claim 1, wherein the apparatus further comprises an output proxy, and the proxy policy further comprises a normalization policy, wherein
  the output proxy is configured to receive the service responses output by the heterogeneous functional equivalents;
  the redundancy controller is further configured to send the normalization policy to the output proxy; and
  the output proxy is further configured to select one of the received service responses as a target service response based on the normalization policy, establish a communication connection between the target service response and the outside of the apparatus, and output the target service response.

7. The apparatus according to claim 6, wherein the output proxy is specifically further configured to:
  select a service request matching content of an external receive end of the apparatus from the received service responses based on the normalization policy, and use the service request as the target service request, wherein the content comprises one of a communication connection, message content, a data format, a message order, an initial time, a delay and a rate.

8. The apparatus according to claim 6, wherein the proxy policy further comprises a second dis-cooperation policy, the second dis-cooperation policy corresponding to the first dis-cooperation policy, and the output proxy is further configured to:
  if the target service response is obtained based on the first dis-cooperation policy and the service request is filtered, complement the content of the target service response based on the second dis-cooperation policy before outputting the target service response, wherein the complemented content comprises: a service response or a protocol field in a service response that does not match the first dis-cooperation policy and the content of the minimization template.

9. The apparatus according to claim 8, wherein the output proxy is further configured to:

if the target service response is obtained based on the first dis-cooperation policy and the service request is modified, restore the content of the target service response based on the second dis-cooperation policy, so that the content of the target service response is consistent with the service request before modification, wherein the restored content comprises one of a communication connection, message content, a data format, a message order, an initial time, a delay and a rate.

10. The apparatus according to claim 6, wherein the output proxy is further configured to manage a cooperation relationship between each heterogeneous functional equivalent and the outside of the apparatus based on the second dis-cooperation policy, isolate information exchange between every two heterogeneous functional equivalents, and shield signal transmission between each heterogeneous functional equivalent and the outside of the apparatus, after selecting the target service response.

11. The apparatus according to claim 10, wherein the output proxy is specifically further configured to:
  obtain structure change modes of the heterogeneous functional equivalents;
  determine, based on the second dis-cooperation policy, whether a structure change mode of each heterogeneous functional equivalent is one of the preset modes, wherein the preset modes comprise the decision mode, the monitoring mode, and the random scheduling mode; and
  if the structure change mode is one of the preset modes, shield a service response, which can leak current preset mode, between each heterogeneous functional equivalent and the outside of the apparatus according to a rule corresponding to the preset mode.

12. A method for encapsulating heterogeneous functional equivalents, used by an input proxy and comprising:
  receiving an external service request, and sending the service request to a redundancy controller to trigger the redundancy controller;
  receiving a proxy policy sent by the redundancy controller, wherein the proxy policy is generated based on a control parameter and comprises an adaptation policy and a first dis-cooperation policy;
  receiving the adaptation policy, and establishing communication connections to selected heterogeneous functional equivalents based on the adaptation policy; and
  sending the service request to the selected heterogeneous functional equivalents via the communication connections, respectively,
  wherein establishing communication connections to selected heterogeneous functional equivalents based on the adaptation policy comprises:
    selecting, based on content in the service request and the adaptation policy, heterogeneous functional equivalents matching the content as heterogeneous functional equivalents for providing a service, and establishing communication connections to the selected heterogeneous functional equivalents,
    wherein the content comprises one of a communication connection, message content, a data format, a message order, an initial time, a delay and a rate; and
    the adaptation policy comprises one of a communication connection, message content, a data format, a message order, an initial time, a delay and a rate of each heterogeneous functional equivalent.

13. A method for encapsulating heterogeneous functional equivalents, used by an output proxy and comprising:

receiving service responses output by the heterogeneous functional equivalents and a proxy policy sent by a redundancy controller, wherein the proxy policy comprises a normalization policy;

selecting one of the received service responses as a target service response based on the normalization policy; and establishing a communication connection between the target service response and outside of an apparatus, and outputting the target service response, wherein the apparatus comprises the redundancy controller, the output proxy, and at least two heterogeneous functional equivalents with a same function, wherein selecting one of the received service responses as a target service response based on the normalization policy comprises:

selecting a service request matching content of an external receive end of the apparatus from the received service responses based on the normalization policy, and using the service response as the target service request, wherein the content comprises one of a communication connection, message content, a data format, a message order, an initial time, a delay and a rate.

14. A device for encapsulating heterogeneous functional equivalents, comprising a transceiver, a processor and a memory, wherein the transceiver is configured to receive an external service request and a proxy policy, wherein the proxy policy comprises an adaptation policy, a normalization policy, a first dis-cooperation policy and a second dis-cooperation policy, the first dis-cooperation policy corresponding to the second dis-cooperation policy;

the processor is configured to establish communication connections to selected heterogeneous functional equivalents based on the adaptation policy, and send the service request to the selected heterogeneous functional equivalents via the communication connections, respectively; and the memory is configured to store the service request and the proxy policy, wherein the processor is specifically configured to:

select, based on content in the service request and the adaptation policy, heterogeneous functional equivalents matching the content as heterogeneous functional equivalents for providing a service, and establish communication connections to the selected heterogeneous functional equivalents, wherein the content comprises one of a communication connection, message content, a data format, a message order, an initial time, a delay and a rate; and the adaptation policy comprises one of a communication connection, message content, a data format, a message order, an initial time, a delay and a rate of each heterogeneous functional equivalent.

15. The device according to claim 14, wherein the transceiver is further configured to receive output responses of the heterogeneous functional equivalents, wherein the selected heterogeneous functional equivalents output the output responses after operating based on the service request; and the processor is further configured to select one of the received service responses as a target service response based on the normalization policy, establish a communication connection between the target service response and outside of an apparatus, and output the target service response.

16. The device according to claim 14, wherein the processor is further configured to filter out, based on the first dis-cooperation policy and a minimization template in the adaptation policy, a communication connection, or a service request not matching content of the minimization template, or a protocol field not matching the external service request;

the processor is further configured to modify content in the service request based on the first dis-cooperation policy, so that the content in the service request matches the heterogeneous functional equivalents, wherein the content in the service request comprises one of a communication connection, message content, a data format, a message order, an initial time, a delay and a rate; and the processor is further configured to manage a cooperation relationship between each heterogeneous functional equivalent and outside of an apparatus based on the first dis-cooperation policy, isolate information exchange between every two heterogeneous functional equivalents, and shield signal transmission between each heterogeneous functional equivalent and the outside of the apparatus.

17. The device according to claim 14, wherein the processor is further configured to: if the target service response is obtained based on the first dis-cooperation policy and the service request is filtered, complement content of the target service response based on the second dis-cooperation policy before outputting the target service response, wherein the complemented content comprises: a service response or a protocol field in a service response not matching the first dis-cooperation policy and the content of the minimization template;

the processor is further configured to: if the target service response is obtained based on the first dis-cooperation policy and the service request is modified, restore content of the target service response based on the second dis-cooperation policy, so that the content of the target service response is consistent with the service request before modification, wherein the restored content comprises one of a communication connection, message content, a data format, a message order, an initial time, a delay and a rate; and the processor is further configured to: manage a cooperation relationship between each heterogeneous functional equivalent and outside of the apparatus based on the second dis-cooperation policy, isolate information exchange between every two heterogeneous functional equivalents, and shield signal transmission between each heterogeneous functional equivalent and the outside of the apparatus, after selecting the target service response.

* * * * *